(12) United States Patent
Peled et al.

(10) Patent No.: US 8,092,955 B2
(45) Date of Patent: Jan. 10, 2012

(54) FUEL CELL HAVING FUEL TANK DIRECTLY ATTACHED TO ANODE ALLOWING PUMP-FREE FUEL DELIVERY

(75) Inventors: Emanuel Peled, Even Yehuda (IL); Tair Duvdevani, Ramat Gan (IL); Avi Melman, Holon (IL); Adi Aharon, Herzliya (IL)

(73) Assignee: Tel-Aviv Univrsity Future Technology Development L.P., Tel-Aviv (IL)

( * ) Notice: Subject to any disclaimer, the term of this patent is extended or adjusted under 35 U.S.C. 154(b) by 773 days.

(21) Appl. No.: 12/081,362

(22) Filed: Apr. 15, 2008

(65) Prior Publication Data

US 2008/0241629 A1    Oct. 2, 2008

Related U.S. Application Data

(62) Division of application No. 10/181,061, filed as application No. PCT/IL01/00055 on Jan. 18, 2001, now Pat. No. 7,413,824.

(51) Int. Cl.
*H01M 8/22* (2006.01)
*H01M 8/04* (2006.01)

(52) U.S. Cl. .................... 429/515; 429/506; 429/462

(58) Field of Classification Search ............... 429/443, 429/447, 462, 506, 515
See application file for complete search history.

(56) References Cited

U.S. PATENT DOCUMENTS

| | | | |
|---|---|---|---|
| 3,143,440 A | 8/1964 | Hunger et al. |
| 3,765,946 A | 10/1973 | Werner et al. |
| 3,935,028 A | 1/1976 | Strasser et al. |
| 4,252,868 A | 2/1981 | Bohm et al. |
| 4,276,353 A | 6/1981 | Novinski et al. |
| 4,623,415 A | 11/1986 | Kahara et al. |
| 4,687,715 A | 8/1987 | Michael |
| 4,780,954 A | 11/1988 | Kato |
| 5,178,971 A | 1/1993 | Itoh et al. |
| 5,432,023 A | 7/1995 | Yamada et al. |
| 5,599,638 A | 2/1997 | Surampudi et al. |
| 5,709,786 A | 1/1998 | Friese et al. |
| 5,766,787 A | 6/1998 | Watanabe et al. |
| 5,773,162 A | 6/1998 | Surampudi et al. |
| 5,834,136 A | 11/1998 | Gao et al. |
| 5,853,909 A | 12/1998 | Reiser |
| 5,861,222 A | 1/1999 | Fischer et al. |
| 5,919,583 A | 7/1999 | Grot et al. |
| 5,926,361 A | 7/1999 | Alford |

(Continued)

FOREIGN PATENT DOCUMENTS

DE    199 13 977 A1    9/2000

(Continued)

OTHER PUBLICATIONS

Peled, E. et al., "A Novel Proton-Conducting Membrane" Electrochemical and Solid State Letters, vol. 1, No. 5, Nov. 1, 1998, pp. 210-211.

(Continued)

*Primary Examiner* — Tracy Dove
(74) *Attorney, Agent, or Firm* — Susanne M. Hopkins; William L. Klima; Ari G. Zytcer

(57) ABSTRACT

The present invention provides improved, low-cost fuel cells having reduced fuel crossover, reduced sensitivity to metal ion impurities and ability to operate under a broad range of temperatures. The invention further provides improved methods for catalyst preparation and a new integrated flow field system for use in $H_2/O_2$ fuel cells.

21 Claims, 12 Drawing Sheets

U.S. PATENT DOCUMENTS

| | | | |
|---|---|---|---|
| 5,952,119 A | 9/1999 | Wilson | |
| 6,007,934 A | 12/1999 | Auer et al. | |
| 6,059,943 A | 5/2000 | Murphy et al. | |
| 6,117,581 A | 9/2000 | Shelef | |
| 6,156,449 A | 12/2000 | Zuber et al. | |
| 6,238,534 B1 | 5/2001 | Mao et al. | |
| 6,447,909 B1 | 9/2002 | Kato et al. | |
| 6,471,850 B2 | 10/2002 | Shiepe et al. | |
| 6,506,513 B1 | 1/2003 | Yonetsu et al. | |
| 6,660,423 B2 | 12/2003 | Neutzler et al. | |
| 6,783,885 B2 | 8/2004 | Shiepe et al. | |

FOREIGN PATENT DOCUMENTS

| | | |
|---|---|---|
| EP | 0828303 A2 | 3/1998 |
| EP | 0828303 A3 | 3/1998 |
| EP | 1087 455 A2 | 3/2001 |
| JP | 59173549 | 10/1984 |
| JP | 01-192742 | 8/1989 |
| JP | 08185879 A | 7/1996 |
| WO | WO 97/02615 | 1/1997 |
| WO | WO 97/21256 | 6/1997 |
| WO | WO 99//08785 | 2/1999 |
| WO | WO 99/44245 | 9/1999 |
| WO | WO 00/42671 | 7/2000 |

OTHER PUBLICATIONS

Partial European Search Report, EPO Form 1507U, Application No. EP 10 16 2432, Applicant: Tel-Aviv University Future Technology Development L.P., mailed on Oct. 21, 2010.

US 8,092,955 B2

FUEL CELL HAVING FUEL TANK DIRECTLY ATTACHED TO ANODE ALLOWING PUMP-FREE FUEL DELIVERY

Cross-Reference:

This application is a Divisional of U.S. application Ser. No. 10/181,061, filed Oct. 15, 2002, which is a National Phase Application filed under 35 U.S.C. 371 of International Application No. PCT/IL2001/000055, filed Jan. 18, 2001, claiming the benefit under 35 USC 365(c) of U.S. Application No. 09/484,267, filed Jan. 18, 2000, and claiming the benefit under 35 USC 365(c) of U.S. application Ser. No. 09/604,297, filed Jun. 26, 2000, the entire contents of each of which is hereby incorporated herein by reference in its entirety.

FIELD OF THE INVENTION

This invention relates to an electric cell that converts the chemical energy obtained in a fuel oxidation reaction directly into electric energy in a continuous process. More specifically the invention relates to fuel cells.

BACKGROUND OF THE INVENTION

Fuel cells are often described as continuously operating batteries or as electrochemical engines. Fuel cells utilize an external supply of fuel and oxygen (or air) and produce power continuously, as long as the fuel and oxygen supply is maintained.

The most classic fuel cell is the $H_2/O_2$ fuel cell of the direct or indirect type, wherein hydrogen is oxidized to form $H_3O^+$ at the anode and oxygen is reduced to water at the cathode. In the direct type, hydrogen and oxygen are used as such, the fuel being produced in independent installations. The indirect type employs a hydrogen-generating unit, which can use as raw material a wide variety of fuels.

Another type of fuel cell is the organic fuel cell. In a direct oxidation cell an aqueous solution of an organic fuel such as methanol, formaldehyde or formic acid, is directly fed into the fuel cell without any previous chemical modification, where the fuel is oxidized at the anode, and oxygen is reduced to water at the cathode.

A major distinguishing characteristic of different fuel cells is in the electrolyte used. NASA's Jet Prepulsion Laboratory (JPL) developed a direct liquid-feed cell using a solid membrane electrolyte. A detailed description of JPL's fuel cells can be found, for example, in U.S. Pat. Nos. 5,599,638 and 5,773,162. These fuel cells operate without any acid electrolyte and comprise solid electrolyte TM membranes fabricated from proton-exchange materials, especially Nafion (manufactured by DuPont). When methanol is used as the fuel, the electro-oxidation of methanol at the anode can be represented by:

$$CH_3OH+H_2O \rightarrow CO_2+6H^++6e,$$

and the electro-reduction of oxygen at the cathode can be represented by:

$$O_2+4H^++4e \rightarrow 2H_2O.$$

Protons generated at the anode are transported directly across the electrolyte membrane to the cathode. A flow of current is sustained by a flow of ions through the cell and electrons through the external load.

SUMMARY OF THE INVENTION

The challenge in fuel cell development for practical applications is to improve the economics through the use of low-cost components with acceptable life and performance.

Thus, the present invention provides by the first of its aspects a fuel cell comprising an anode chamber including an anode and means for providing fuel to the anode, a cathode chamber including a cathode and means for providing oxygen to the cathode, and a solid electrolyte membrane disposed between said cathode and said anode, wherein said solid electrolyte membrane is a proton conducting membrane having pores with a diameter, smaller than 30 nm, said membrane, comprising:

(i) 5% to 60% by volume, preferably 8% to 30% by volume of an electrically nonconductive inorganic powder having a good acid absorption capacity, said powder comprising nanosize particles;

(ii) 10% to 90% by volume, preferably 30% to 80% by volume of an acid or aqueous acid solution; and (iii) 5% to 50% by volume, preferably 12% to 40% by volume of a polymeric binder that is chemically compatible with said acid, oxygen and said fuel.

Typically, when the fuel used is organic, it is provided as a fuel aqueous solution.

The solid proton conducting membrane used in the fuel cells of the present invention has been described in WO 99/44245. The polymeric binders used in these membranes may be selected from the group consisting of poly(vinilydenfluoride), poly(vinilydenfluoride)hexafluoropropylene, poly(tetrafluoroethylene), poly(methyl methacrylate), poly(sulfoneamide), poly(acrylamide), poly(vinylchloride), acrylonitrile, poly(vinylfluoride), Kel F™ and any combinations thereof.

The inorganic nanosize powder used for preparing the solid proton conducting membrane may be selected from the group consisting of $SiO_2$, $ZrO_2$, $B_2O_3$, $TiO_2$, $Al_2O_3$, hydroxides and oxy- hydroxydes of Ti, Al, B and Zr, and any combinations thereof.

As described above, the proton conducting membrane used in the fuel cell of the invention comprises, inter alia, an acid. Typically, the diameter of the membrane pores is smaller than 30 nm, preferably smaller than 3 nm, more preferably smaller than 1.5 nm. As opposed to the solid electrolyte membrane described for example in U.S. Pat. No. 5,599,638, wherein no acid is present in free form, the solid electrolyte membrane used in the fuel cell of present invention contains free acid molecules entrapped in the pores of the membrane. Alternatively, it may contain acid molecules bonded to the inorganic powder.

Thus, such a PCM comprises a matrix made of silica powder, preferably nanopowder, bonded with an appropriate polymer binder described above, and acid molecules chemically bonded to the silica, thus reducing or avoiding the need to insert acid into the fuel solution. Other nanopowders can be used in a similar way. According to this option the acid, preferably sulfonic acid, is chemically bonded to the inorganic nanopowder directly or through an organic segment R selected from 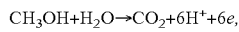, 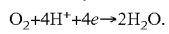, where n is an integer from 1 to 10 and m is an integer from 1 to 5, perfluoroaryl, polyfluoroaryl, perfluorostyrene, polyfluoro styrene and similar segments where up to 50% of the hydrogen or fluorine atoms were replaced by chlorine atoms.

A non limiting procedure to form sulfonic acid groups bonded to silica is described hereinbelow: nano size silica powder is boiled in pure water for two hours to enrich the powder surface with OH groups. Than the hydrated powder is immersed in a solution of cloro, methoxy, or alkoxy organo sulfur silan of the type $CH_3COSR$—$Si(OCH_3)_3$ or $CH_3COSR$—$SiCl_3$, where R is one of the organic segments listed above. The silan reacts with the surface OH groups of the silica powder to form up to one monolayer of the organic sulfur silan. Than the powder is oxidized by air and the thioacetat group is converted into a sulfonic acid group. This step is described in the following equation:

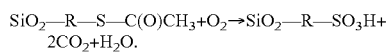

The obtained chemically bonded sulfonic acid is stable in strong acids at 90° C. and, therefore, it may be used in the preparation of a PCM for fuel cell applications, instead of pristine $SiO_2$.

The anode and the cathode comprise a catalyst layer and optionally also a porous backing layer. A preferred catalyst used at the anode is for example nano size platinum-ruthenium powder, while preferred catalysts used at the cathode are for example nano size platinum powder and alloys thereof with non noble metals, for example Ni, Co, and Fe. In such alloys the ratio between platinum and the metal (Pt:M atomic ratio) is between about 1:3 to about 3:1.

A large variety of low vapor pressure acids that are compatible with the cell hardware and with the catalysts at both electrodes may be used in accordance with the invention.

The backing layer is preferably made of carbon. This layer is porous and is used for support and at the same time for making electrical contact between the housing and the catalyst powder, which by itself is connected to the membrane.

The means for circulating an fuel past the anode and for flowing oxygen or air past the cathode include also means for withdrawing carbon dioxide, unused fuel and water from the anode side and for withdrawing unused oxygen and water from the cathode side.

One advantage of the fuel cell according to the invention over current art fuel cells is that it uses a membrane that is easily wet. Thus, there is no need to develop special means for membrane humidification, as is the case in current art fuel cells, as evident, for instance, from U.S. Pat. No. 5,952,119 to Wilson, which states that "one of the primary challenges in attaining optimal performance of polymer electrolyte membrane fuel cell is attaining effective hydration of the ionomeric membrane structure". Wilson suggests solving this problem by applying a hydrophilic wick to wick liquid water to the membrane. As the fuel cell of the present invention does not show wetting difficulties, such a wick is saved, and the cell construction is simplified.

According to one embodiment of the present invention, the fuel cell of the invention is a $H_2/O_2$ fuel cell, wherein two sets of integrated flow channels are engraved in the cathode chamber or in the anode chamber. In one set of channels of this embodiment reactant gases are flowing, and in the other—the electrolyte is circulating.

According to yet another aspect of the present invention there is provided a method for reconditioning a direct oxidation fuel cell, the method comprises the steps of:
(a) operating the cell at a reversed voltage of 0.6 to 1.3V for a period of time T.

Preferably, the time period T is between 1 to 100 minutes. A longer period T is preferable as the cell ages or as it suffers a higher level of impurities. Preferably, the voltage is between 0.6 and 1.3V.

The inventors applied this reconditioning procedure 10 times, each time for 1 to 30 minutes, during a 3500 hours operating period of a fuel cell and found an improvement of the cell voltage of 50 to 100 mV.

The invention also provides a method for preparing a catalyst layer for use in a fuel cell, said method comprising the steps of forming up to one monolayer of a catalyst on the surface of a nanosize inorganic powder, such monolayer serving as a nucleation site, forming additional one or more catalyst layers on the top of said first monolayer to obtain catalyst particles and subsequently binding the obtained particles to the carbon backing layer and/or to the proton conducting membrane.

According to another aspect of the present invention there is provided a hybrid power source comprising a liquid feed fuel cell according to the invention, a DC to DC converter and a rechargeable battery.

According to another aspect of the present invention there is provided a device for controlling the water return flow from the cathode side to the anode side in a fuel cell, comprising a water or fuel solution level sensor and air or oxygen pressure control unit placed in the cathode compartment, and a fuel cell comprising such a device.

According to another aspect of the present invention there is provided a method for reducing crossover current in a fuel cell having an anode chamber with an anode and a fuel tank for providing said anode with fuel, a cathode chamber with a cathode and means for providing said cathode with oxygen in a given pressure, a solid electrolyte membrane disposed between said cathode and said anode, and a tank for water or fuel solution, an air or oxygen pressure control unit and a sensor for sensing the level fuel solution in said fuel tank and means for controlling said pressure in response to said level of water or fuel, comprising the steps of:
(a) sensing the level of the water or fuel in the water or fuel tank;
(b) controlling the air or oxygen gas pressure in the cathode chamber to increase as the level of water or fuel solution sensed in step (a) decreases;
thus reducing the crossover current.

According to another aspect of the present invention there is provided a free direct oxidation fuel cell having a low crossover current density, wherein the fuel solution tank is directly attached to the anode chamber, the fuel concentration is between 1% and 40% (w/w) and the ratio between the tank volume (in ml) and the electrode area, in $cm^2$ is between 3:1 and 30:1.

According to another aspect of the present invention there is provided an orientation independent direct oxidation fuel cell. system having
(a) an anode chamber with an anode, fuel inlet and gas outlet;
(b) a cathode chamber with a cathode and oxygen or air inlet;
(c) an electrolyte membrane disposed between the anode and the cathode; and
(d) a fuel tank connected to the anode chamber, wherein
 i) said fuel tank being divided by a movable barrier into two parts, said first part of the fuel tank being capable of containing fuel or fuel solution and connected to the anode chamber, said second part of the fuel tank holding gas with pressure greater than atmospheric pressure or having a closable gas inlet;
 ii) said gas outlet being closed with a gas permeable hydrophobic matrix;
said barrier being capable of directing fuel or fuel solution from the fuel tank to the anode chamber irrespective of the fuel cell orientation.

BRIEF DESCRIPTION OF THE DRAWINGS

In order to understand the invention and to see how it may be carried out in practice, several embodiments will now be described, by way of non-limiting example only, with reference to the accompanying drawings, in which.

DETAILED DESCRIPTION

Figure 1:
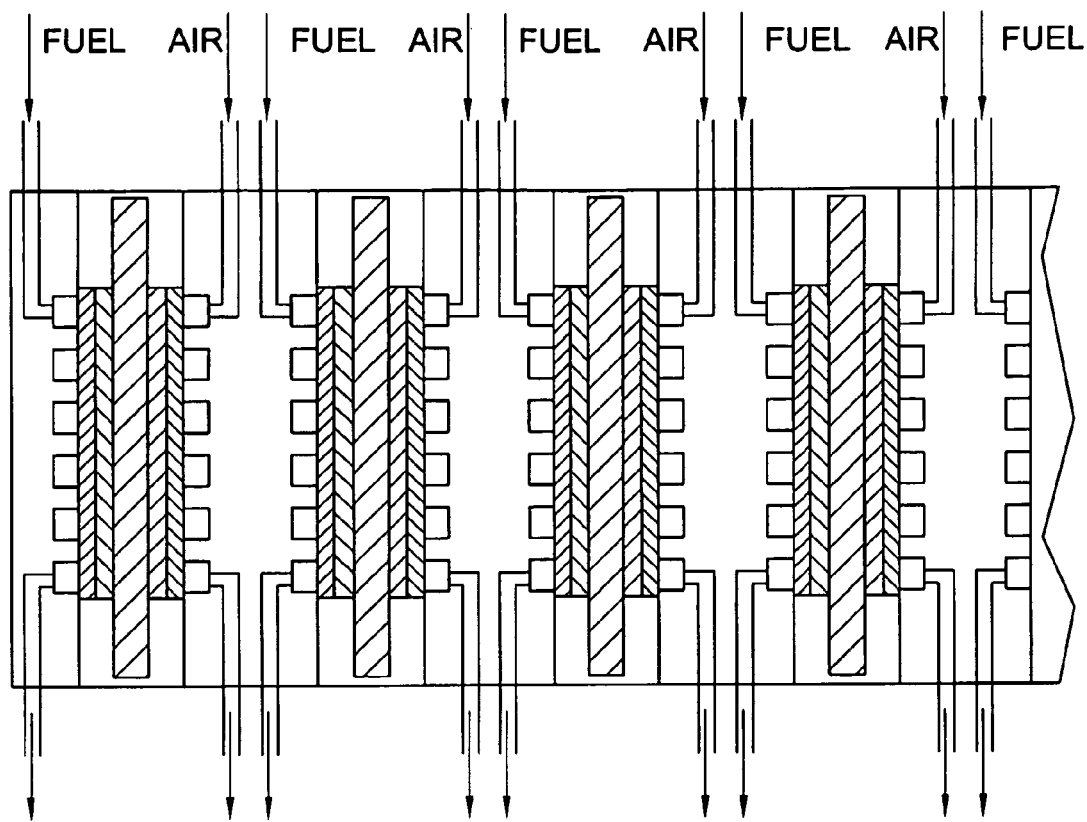
FIG. 1 shows a schematic representation of a multi-cell fuel system.

Several embodiments of the invention will be described and exemplified with reference to the figures.

According to one aspect of the present invention there is provided an improved fuel cell. The fuel cell to be improved by the invention includes an anode chamber including an anode and means for providing fuel to the anode, a cathode chamber including a cathode and means for providing oxygen to the cathode, and a solid electrolyte membrane disposed between said cathode and said anode. Such fuel cells and their way of operation are well known in the art. The present invention seeks to improve prior art fuel cells by applying as an electrolyte membrane a proton conducting membrane having pores with a diameter, smaller than 30 nm, said membrane comprising:

(i) 5% to 60% by volume, preferably 8% to 30% by volume of an electrically nonconductive inorganic powder having a good acid absorption capacity, said powder comprising nanosize particles;
(ii) 10% to 90% by volume, preferably 30% to 80% by volume of an acid or aqueous acid solution; and
(iii) 5% to 50% by volume, preferably 12% to 40% by volume of a polymeric binder that is chemically compatible with said acid, oxygen and said fuel.

The anode, the cathode and the solid electrolyte membrane are typically hot pressed so as to form a single structure unit. The fuel used by the cell may be, for example, a pure organic liquid fuel, an aqueous solution of an organic fuel, a water solution comprising an acid and an organic fuel, or a gas. Suitable fuels include fuels selected from the group consisting of methanol, ethylene glycol, ethanol, glycerol and its formate and oxalate esters, oxalic acid, formaldehyde, formic acid, glyoxylic acid and its methyl esters, glyoxylic aldehyde, methylformate, dimethoxymethane, trimethoxymethane and trioxane. A large variety of low vapor pressure acids that are compatible with the cell hardware and with the catalysts at both electrodes may be used in the acid-fuel solution. Non-limiting examples for such acids are: alkyl sulfonic acids; polyfluoroolefin sulfonic acid; perfluoroolefin sulfonic acid; aryl sulfonic acids; polyfluoroaryl sulfonic acids, such as polyfluorobenzen, polyfluorotoluene, or polyfluorostyrene sulfonic acid; perfluoroaryl sulfonic acids, such as perfluorobenzene, perfluorotoluene or perfluorostyrene sulfonic acid, and similar acids where up to 50% of the hydrogen or fluorine atoms were replaced by chlorine atoms; $CH_3CH_2SO_3H$; benzyl sulfonic acid; $CF_3(CF_2)_nSO_3H$; $HO_3S(CF_2CH_2)_nSO_3H$; $CF_3(CF_2CH_2)_nSO_3H$; $HO_3S(CF_2)_n SO_3H$ where n is an integer having a value of 0 to 9 or 1 to 9, Nafion™ ionomers; phosphoric acid; sulfuric acid; sulfamic acid; perfluorinated carbon backbone acids having sulfonic acid side chains, of the formula —$O(CF_2CF_2)_nSO_3H$ wherein n is 1 or 2; HCl; HBr; and mixtures thereof.

To the acid-fuel solution it is possible to add, according to the present invention, a soluble catalyst such as a macrocyclic complex of nickel, cobalt or iron. Such a complex may promote the oxidation of the fuel and/or the reduction of the oxygen. The solid electrolyte membrane is a proton conducting membrane (PCM) having pores with a typical diameter smaller than 30 nm, preferably smaller than 3 nm, more preferably smaller than 1.5 nm. The membrane comprises inorganic powder of nanosize particles, an acid or aqueous acid solution, and a polymeric binder. The inorganic powder is electrically nonconductive, it has a good acid absorption capacity, and it constitutes 5% to 60%, preferably 8% to 30%, of the membrane volume. The acid or aqueous acid solution constitutes 10% to 90%, preferably 30% to 80% of the membrane volume. The acid of the membrane 6 is that of the fuel-acid solution. The polymeric binder constitutes 5-50% preferably 12 to 40% of the membrane and is chemically compatible with the acid of the membrane, with oxygen and with the fuel used in the cell.

It is shown in detail hereinbelow, that in comparison to current-art Nafion™ membranes, the PCMs used in the fuel cell of the present invention have a better conductivity and lower crossover for methanol or other fuels. It is also shown that the PCMs of the invention have the advantages over the Nafion™ PCM in not being affected by heavy metal impurities and in being operable at temperatures higher than 100° C. or lower than 0° C. Furthermore, the cost of the PCMs of the invention is lower than that of Nafion™ by about two orders of magnitude, thus lowering the price of the entire fuel cell.

The invention further provides the following improvement in fuel cells:

Improving the Efficiency of a Fuel Cell

In this section we describe several techniques for improving the efficiency of fuel cells. These techniques were invented during the investigation of the fuel cell of the invention, however, some of them may also be applied for improving current-art fuel cells.

As known in the art, one of the factors that reduce fuel cells efficiency is fuel crossover, i.e. the undesired permeation of the fuel molecules through the electrolyte membrane to the cathode chamber, thus lowering the operating potential of the fuel cell. The rate of crossover is known to be proportional to the permeability of the fuel through the solid electrolyte membrane and to increase with increasing concentration and temperature.

The inventors found that the use of the fuel cell of the invention with pores smaller than 1.5 nm is one way to reduce the crossover current. For example, the crossover current density for a Nafion 117 membrane (that have pores of 3-4 nm), in 1M methanol at 60° C. is 140 mA/cm², while that of the PCM used in the present invention (having pore size of less than 1.5 nm) is 18.5-25 mA/cm$^2$, at 65° C. and 31.8 mA/cm$^2$ at 75° C.

Furthermore, it has been found by the present inventors that the permeability of the solid electrolyte membrane to the liquid fuel can be further reduced with minor effect on the conductivity, by changing the membrane properties such as pore size diameter and pore's neck diameter. Such a change may be achieved by filling these pores with proton conducting materials or by adding salts to the fuel acid solution. Therefore, in a preferred embodiment of the present invention the solid electrolyte membrane has pores that are partially filled with proton conducting materials. Another preferred embodiment of the present invention has a solid electrolyte membrane which further comprises salts. Other PCMs, such as Nafion™ may also benefit from partially filling their pores with proton conductive materials. In addition, it has been found that fuel crossover may be further reduced by filling the pores of the PCM with a $Na_2SiO_3$ solution and hydrolyzing the silicate in sulfuric acid to form in the pores nano particles of hydrated silica or silicic acid. Alternatively, this effect can also be achieved by filling the pores with a polyhetroacid such as $H_3PW_{12}O_{40}$ or $H_4SiW_{12}O_{40}$ and preferably hot pressing the PCM so as to reduce the size of the pore's neck and to lock the acid in the pores.

Fuel crossover may also be reduced by lowering the concentration of the fuel or by choosing a fuel having a molecular size larger than that of methanol, thus having a smaller diffusion coefficient. Examples of such known fuels are, methylformat, ethylformat, dimethoxymethane, trimethoxymethane and trioxane.

It has been found that the crossover of methanol in the fuel cell of the invention may be further reduced, by adding to the acidic fuel solution salts such as soluble organic sulfonates, for example: potassium benzene sulfonate, or the sulfates of zinc, aluminum, potassium, sodium, cobalt, manganese, nickel, cesium, or magnesium preferably in the form of hydrates. Suitable salts can include $ZnSO_4$, $Al_2(SO_4)_3$, $MgSO_4$, $CoSO_4$, $MnSO_4$, $Na_2SO_4$, $K_2SO_4$, and polyhetroacids selected from the group consisting Of $H_3PW_{12}O_{40}.40H_2O$ and $H_4SiW_{12}O_{40}.29H_2O$, provided that the salts or polyhetroacids do not induce precipitation of solids during operation of the fuel cell. Typical amounts of salts to be added are such as to provide an acid to salt molar ratio of between 1:10 and 10:1. Preferable salts are those wherein both cation and anion are not susceptible to electrochemical reactions, such as sulfates of alkyl metals, alkaline earth metals, zinc and aluminum. Other considerations in selecting a salt to be used according to this aspect of the present invention is that preferable salts should be compatible with oxygen, with the catalysts and with the fuel and should not form electronically conductive residues when dry. They preferably have high dehydration temperatures, indicating a strong bonding of water. Examples for such hydrates and their decomposition temperatures (in brackets) are $ZnSO_4.7H_2O$ (280° C.), $Al_2(SO_4)_3.18H_2O$ (86° C.), $MgSO_4.7H_2O$ (150° C.), $NiSO_4$, $CoSO_4.7H_2O$ (96.8° C.), $MnSO_4.7H_2O$ (280° C.). Alkali sulfates such as $Cs_2SO_4$ and $Na_2SO_4$ have high solubility and reduce the water vapor pressure; thus, enabling the use of the fuel cell at low pressures above 100° C. Ammonium sulfate has high solubility but it may decompose slowly, therefore, it may also be useful at low temperatures. Another advantage in adding salts to the fuel solution is that some of them may function at elevated temperatures as molten hydrates and reduce the water vapor pressure, thus allowing for the operation of the fuel cell at temperatures higher than 100° C. Operating at such elevated temperatures may be advantageous, since at these temperatures steam may be produced to allow co-generation of heat and electricity, and to lead to higher energy conversion efficiency. In addition, at high temperature of operation the fuel cell can tolerate higher concentrations of CO and thus, smaller amounts of expensive catalyst are needed. Notably, apart from the salts added to the fuels, it is also the acid contained in the fuel solution which helps fuel cells which make use of acidic fuel solution to operate in temperatures wherein water is not liquid. For instance, a 27% $H_2SO_4$ solution freezes at -27° C.

Sensitivity to Heavy Metals

As mentioned above, the PCM used in the fuel cells of the invention is not affected by heavy metal impurities, while Nafion is very sensitive to heavy metals impurities. For example, 500 ppm chromium reduced the conductivity of a Nafion based membrane by a factor of eight from 0.1 S/cm to 0.013 S/cm (Warthesen and Shores Extended Abstract Vol. 33$^{rd}$). The same concentration of iron, which has similar effect on conductivity as chromium, did not significantly affect the conductivity of the PCM used in the invention. The tested PCM consisted of (V/V) 24% PVDF (polyvinilyden fluoride) as a binder, 16% $SiO_2$ as an inorganic nanopowder and 60% 3M sulfuric acid. The conductivity measured without iron impurities was 0.18 S/cm, while that measured in the presence of 500 ppm iron sulfate was 0.17 S/cm. This feature of the PCM used in the invention is very important and unique as it enables the use of catalysts consisting of non noble metals or Pt alloys with non-noble metals (M) such as Fe, Ni or Co. It was found that Pt-M alloys are much better catalysts for oxygen reduction, and the preferred ratio Pt-M is between 1:3 to 3:1. These results also make possible the use of metals like super alloys and low corrosion stainless steel alloys for the fuel cell hardware and for peripheral subsystems with smaller risk of affecting the conductivity of the membrane.

Preparation of a Catalyst Layer

The catalyst used for the air (oxygen) cathode is commonly nano particles (preferably 2-5 nm) of Pt or Pt alloys where the one used at the methanol anode is a Pt—Ru alloy of nano size (preferably 5-10 nm) particles. However, in order to save the cost of expensive noble metals, it is possible to use non noble metal based alloys such as for example Ni, Fe or Co and coat them with the required noble metal catalyst by common electrochemical or chemical processes. The thickness of such catalyst layer may be between less than one monolayer to 20 monolayers.

After long operation periods, the bond between the catalyst particles and the supporting carbon matrix is lost leading to the degradation of the fuel cell. In view of that it is proposed in the present invention to bind the nano size catalyst to a nano size ceramic powder and subsequently bind the obtained particles to the carbon backing layer and to the PCM. A good way to perform this is to use the well-known commercially available electroless process. According to this process, up to one monolayer of a catalyst salt (like $PtCl_4$, $RuCl_3$, etc.) is adsorbed in the first step on nano size hydrated silica powder by immersing the powder in a solution containing a predetermined amount of the catalyst salt. Then, in the second step, a proper amount. of a reducing agent like formaldehyde, methanol, formic acid or hypophosphite is added at a suitable pH and temperature to form up to one monolayer of catalyst bonded to the surface of the ceramic powder. This monolayer provides nucleation sites for further deposition. Next, one or several catalyst salts and more reducing agents are added to form the final size of the catalyst particles. For a methanol anode it is preferred to form either a Pt-Ru alloy catalyst layer or to form two consecutive layers of Pt on Ru or Ru on Pt with atomic ratio of 1:10 to 10:1. Other elements, like Sn, Os, Ni can be added to the catalyst layer to further improve the kinetics of fuel oxidation. In the same way catalyst layers consisting of Pt or Pt nano size alloys with Co, Ni, Fe, or Ag can be prepared for the oxygen cathode.

The present invention also provides an improvement in hydrogen/oxygen fuel cells, which use a PCM according to WO 99/44245, having acid solution as its electrolyte, instead of current art Nafion™ based electrolyte membranes. According to this improvement, a new integrated gas-acid solution flow system (shown in FIG. 2) was designed in order to prevent changes in electrolyte concentration during fuel cell operation. In this system two integrated sets of flow channels 100 and 110 are engraved into the cell housing, as opposed to one set of flow channels generally employed in fuel cells. In one set of channels reactant hydrogen gas is flowing and in the second set an aqueous acid solution (i.e. electrolyte) is circulating. The electrolyte pressure in the integrated flow field system can be equal, higher or lower then the reactant gas pressure. If it is desired to prevent from reactant gas to penetrate into the flow channels of the electrolyte, a higher electrolyte pressure will be used. At the contrary, if it is desired to prevent the electrolyte from penetrating into the gas flow channels, a lower electrolyte pressure will be used. If both effects are equally undesired, equal pressures of electrolyte and reactant gas will be used.

When preparing the integrated flow field system in the housing of the fuel cell, the maximum allowed distance between adjacent electrolyte and gas flow channels would usually be a factor of the membrane capillary forces. The ratio of electrolyte flow channels to gas flow channels will usually be determined by individual system optimization and by comparing the need to supply electrolyte versus the need to supply reactant gasses.

Figure 2:
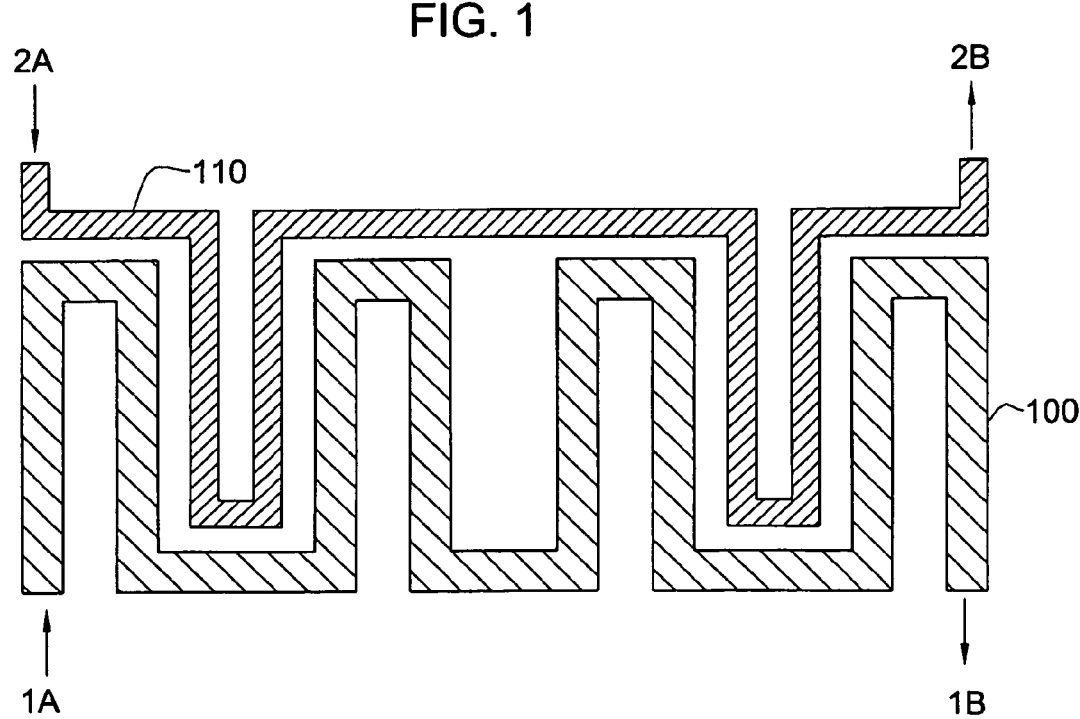
FIG. 2 shows an integrated gas-acid solution flow field system used in a hydrogen/oxygen fuel cell.

In FIG. 2 an integrated flow system is shown schematically. Through the channel 100 a reactant gas, i.e. hydrogen, (entrance at 1A and exit at 1B) flows, while through the channel 110 the electrolyte (entrance at 2A and exit at 2B) is circulated. In the flow system shown schematically in FIG. 2 the ratio of electrolyte flow channels to gas flow channels is 1:2 and the maximum distance between adjacent electrolyte flow channel and gas channel is 8 mm.

The integrated flow field system of the invention can be formed either on the anode side or on the cathode side or on both sides.

The integrated flow field system can also be used as a part of the temperature control system, or as a part of the water removal system (by controlling water vapor pressure via temperature gradient).

Hybrid Power Sources

Direct methanol fuel cell (DMFC) and liquid feed fuel cells (LFFC) are low power sources. However, devices like cellular telephones, computers and small electric vehicles need high power for short times. For these and for similar applications it is possible to combine a fuel cell according to the invention with a small high power rechargeable battery, which supplies the high power when required. Such a combination is advantageous over current art hybrid power source, inter alia thanks to the small crossover current. Today DC to DC converters can start working from 0.7V. As a result it is possible to combine as few as two or three fuel cells (in a series combination) through a DC to DC converter to a battery. If the crossover current density is small enough, say 15 preferably 5 $mA/cm^2$ or less, such a hybrid power source need not be fueled very often. Therefore, this hybrid power source is preferably with a fuel cell of low crossover current such as the fuel cell of the invention. The fuel cell charges the battery and supplies the low power demand while the high power battery supplies the heavy loads. This small number of required fuel cells enables the use of a flat and thin fuel cell system.

For example, to power a cellular phone it is possible to use a hybrid power source built of two thin methanol fuel cells, connected in a series combination, a DC to DC converter and a small high power lithium ion cell.

Water Balance Mechanism

In any fuel cell based on a proton conducting membrane the protons that cross through the proton conducting membrane carry with them about three water molecules per proton. In a DMFC six protons move through the membrane for each methanol molecule. It means that 18 water molecules are carried out by the protons per each methanol molecule that was oxidized.

This phenomenon causes a significant loss of water. Usually, in order to minimize water loss, the water from the exhaust of the fuel cell are collected and recycled. A new way to minimize water loss is suggested here. It was found that the application of excess pressure in the cathode compartment causes a decrease in the methanol crossover. Each 0.1 atmospheres excess gas pressure causes a decrease of about 10% in the crossover current (for example, at 1M methanol and at 60 degree C. it decreases by 7 $mA/cm^2$, from 70 $mA/cm^2$ to 63 $mA/cm^2$). This is explained by hydraulic stream of the fuel solution from the cathode side to the anode side. As the water methanol ratio is about 53:1, the back stream of water by this effect is equivalent to 7×53 or 371 $mA/cm^2$, or to a water flux of $0.371 \times 10^{-6}$ moles per sec.cm2. This effect can be utilized as water return mechanism in any fuel cell comprising a proton conducting membrane. At steady state the protons current equals the external load electronic current and the water flux carried out by the protons is three times larger. As a result at a load of 100 $mA/cm^2$ the water flux is equivalent to 300 $mA/cm^2$ and an excess pressure of 0.1 atmospheres may be enough to return the water back from the cathode side to the anode side. A water (or fuel solution) level sensor can be installed in the water (or fuel solution) tank and the air or oxygen pressure at the cathode compartment will be controlled to keep this water (or fuel solution) level constant.

Such a device was found by the inventors to reduce the crossover current. It is therefore provided by the present invention a device comprising a solution level sensor and a gas pressure control unit; said gas pressure control unit being capable to control the gas pressure in response to the solution level as sensed by the sensor. In particular the invention provides a fuel cell having an anode chamber with an anode and means for providing the anode with fuel, a cathode chamber with a cathode and means for providing the cathode with oxygen in a given pressure, a tank for water or fuel solution, an air or oxygen pressure control unit and a sensor for sensing the level of the water or fuel solution in said tank and means for controlling said pressure in response to said level of water or fuel, and a method for reducing crossover current in such a fuel cell, comprising the steps of:

(a) sensing the level of the water or fuel solution in the water or fuel solution tank;
(b) controlling the air or oxygen gas pressure in the cathode chamber to increase as the level of water or fuel solution sensed in step (a) decreases;

thus reducing the crossover current.

Pump Free DOFC

The present invention also provides, according to another of its aspects, for a direct oxidation fuel cell, which has no pumps. The pump and valves of current art fuel cells, which are not needed any more according to this aspect of the invention, are used to deliver fuel from a fuel reservoir to the anode chamber. This delivery is needed because current art crossover levels are such that necessitate large fuel reservoirs (due to large quantities of fuels that are spent on crossover). The present invention thus provides for a pump free direct oxidation fuel cell, wherein the fuel tank is directly attached to the back side of the anode (the opposite side to the PCM), as, for instance illustrated in Example 5, bellow. In order for such a cell to be of practical use, it should have a low crossover current, typically 15 mA/cm$^2$ or less, preferably 5mA/cm$^2$ or less, more preferably 2 mA/cm$^2$ or less. Otherwise, the fuel tank should be non-practically large, or the lifetime of the cell becomes inconceivably short. The required low crossover current may be achieved by applying a PCM of the kind described in WO99/44245, or its improvement suggested above.

At room temperature, the crossover current density measured in a fuel cell according to this aspect of the invention provided with 3% methanol, was less than 5 mA/cm$^2$. A 25 cm$^2$ cell can supply between 300 to 600 mA and has a crossover of 125 mA (under no load conditions). When a tank of 300 ml acidic fuel solution is attached to such a pump free DOFC it contains (3%×300 ml=) 9 gr methanol, which may produce 45 Ah. These 45 Ah may be consumed by the crossover for 720 hours. Under these conditions a few grams of methanol should be added to the fuel tank once a week, making it a very convenient power source.

Typically, two or three such cells are used in combination with a DC to DC converter to give a hybrid power source as described above. Such a hybrid power source may be conveniently used as a battery charger for cellular phones and other small appliances. For a practical, pump free DOFC having a PCM with crossover current density of between 1.5 mA/cm$^2$ to 15 mA/cm$^2$. The ratio between the fuel tank volume (in ml) and the electrode area (in cm$^2$) should preferably be between 1:3 to 1:230.

Orientation Independent Fuel Cell

When a fuel cell is used in a portable device, such as cellular phone, it should be designed to be orientation independent, so that fuel reaches the cell from the fuel tank irrespective of the cell orientation. Thus, the present invention provides, according to another of its aspects, an orientation independent direct oxidation fuel cell, having an anode chamber with an anode, fuel inlet and gas outlet, said gas outlet being closed with a gas permeable hydrophobic matrix; a cathode chamber with a cathode and oxygen inlet; an electrolyte membrane disposed between the anode and the cathode; and a fuel tank connected to the anode chamber, wherein said fuel tank being divided by a movable barrier into two parts and; said first part of the fuel tank being capable of containing fuel and is connected to the anode chamber, said second part of the fuel tank having a closable gas inlet, and said barrier being capable of directing fuel from the fuel tank to the anode chamber irrespective of the fuel cell orientation.

Usually, said second part of the fuel tank is full with gas at a pressure that is higher than atmospheric pressure so that the gas is capable of pushing the barrier to direct fuel out of the fuel tank into the anode chamber. Alternatively, the second part of the fuel tank is full only with atmospheric air until operation, when it is filled through the gas inlet with $CO_2$, evolving from the oxidation of the fuel at the anode chamber.

Such an orientation independent fuel cell is also pump free and require only a small number of valves.

The invention will be further described in more detail in the following non-limiting examples.

EXAMPLE 1 a) First Fuel Cell Configuration

A fuel cell housing was fabricated from synthetic graphite plates purchased from Globetech Inc., in which a flow field was engraved.

The anode was formed using a platinum-ruthenium ink that was spread on a carbon fiber sheet commercially available from Toray TM paper. Several types of inks were prepared, as follows:

1. Type A was prepared by mixing 600 mg of 60% Pt:Ru on Vulcan XC-72 (purchased from E-Tek Inc), 60 mg Kynar 2801 PVDF, 0.26 ml propylene carbonate (PC) and about 1.5 ml of cyclopentanon;

2. Type B was prepared by mixing 600 mg of 20% Pt/10% Ru/Vulcan C-72 (purchased from ElectroChem, Inc), 60 mg Kynar 2801 PVDF, 0.38 ml propylene carbonate (PC) and about 1.5 ml of cyclopentanon;

3. Type C was prepared by mixing 600 mg of 20% Pt/10% Ru/Vulcan XC-72 (purchased from ElectroChem, Inc), 60 mg Kynar 2801 PVDF, 60 mg Aerosil 130 (purchased from Degussa AG), 0.42 ml propylene carbonate (PC) and about 1.5 ml of cyclopentanon.

The inks were magnetically stirred over night and then 3-4 layers were painted by a paint brush on the Toray™ paper.

The cathode was formed by painting a Pt ink on teflonated Toray™ paper. The ink was prepared by mixing 600 mg of 80% Platinum on Vulcan XC-72 (purchased from E-Tek, Inc), 60 mg Kynar 2801 PVDF, 0.17 ml propylene carbonate (PC) and about 1.5 ml of cyclopentanon.

The PCM was manufactured by mixing 14.87 g of powdered Kynar PVDF 2801-00 and 12.88 gr of high surface area, 16 nm particle size silicon dioxide, >99.8% (Degussa), with 150 ml of cyclopentanon and 21 ml of propylene carbonate (PC). Part of the viscous mixture obtained, was poured onto K control coatter (R K Print, Coat Instruments) and a film was made by using doctor blade method. The film was allowed to dry at room temperature for several hours and an elastic, strong, transparent film was obtained.

The film was washed by using double distilled water in order to remove the PC. Following the washing, a catalyst layer (Pt:Ru or Pt, depending on the electrode) was painted on the outer side of the membrane. Following this step, the film was immersed in 30% wt $H_2SO_4$ for 1.5 hours at 60° C. or over night at room temperature. After cooling the film was placed between the Toray papers, a polypropylene sealing was inserted and the cell was assembled. The impedance of a six cm$^2$ cell thus obtained was measured by using AC impedance spectroscopy Solartron model SF 1260 and was found to be smaller than 0.1 ohms (at 25°±3° C.).

Other cells were manufactured by hot pressing a PCM sandwiched between two Toray TM papers coated by proper catalysts, at temperatures between 70 and 130° C.

Figure 3:
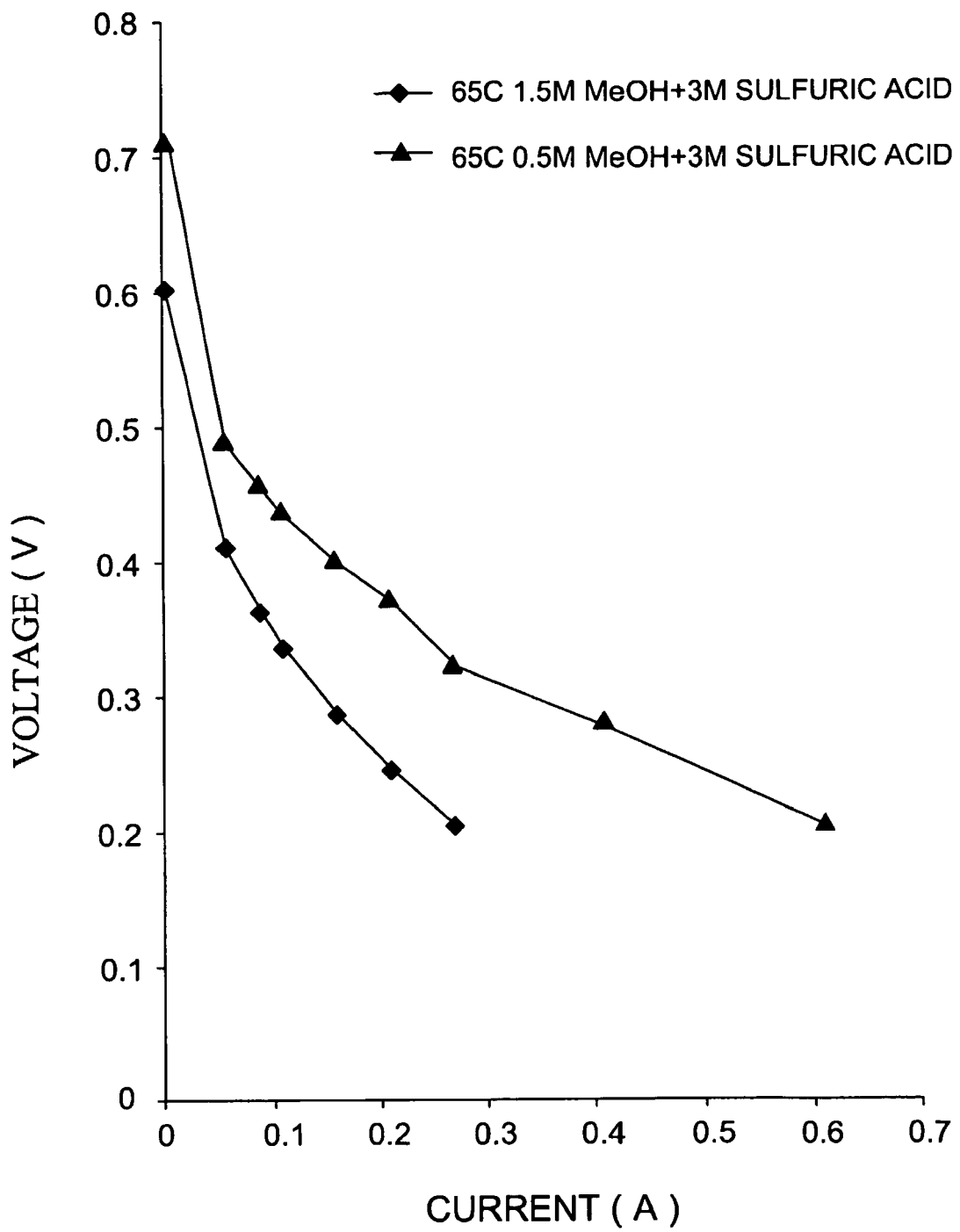
FIG. 3 shows a graph illustrating polarization curves at different methanol concentrations.

During fuel cell operation an aqueous solution containing acid and 0.4-2 mole/liter methanol was circulated past the anode (with the use of a peristaltic pump type) at different flow rates, from 1 to 20 ml/min. FIG. 3 shows polarization curves for different methanol concentrations.

Figure 4:
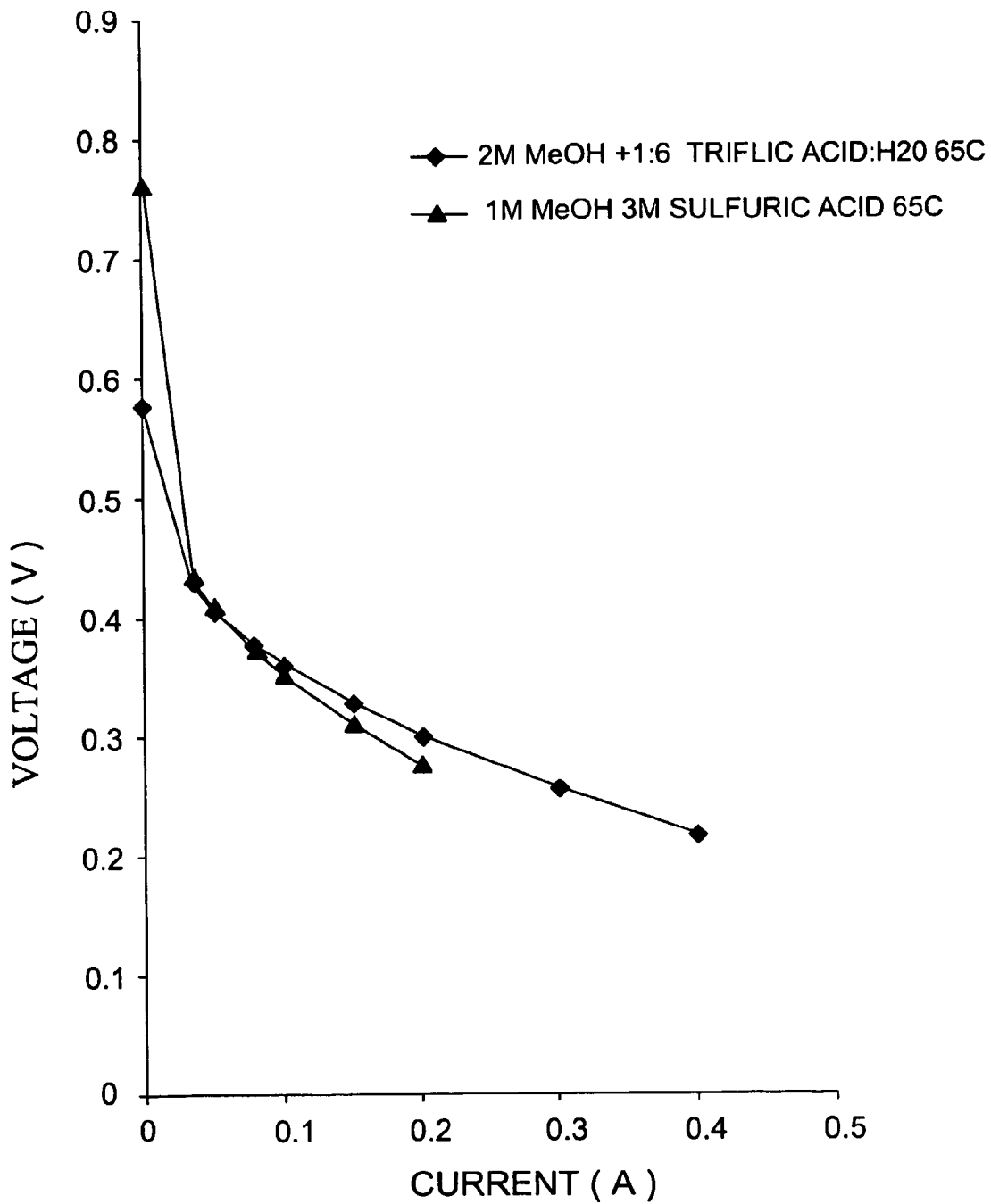
FIG. 4 shows a graph illustrating polarization curves for different acids.

The following acids and acid concentrations were tested: 1-3 mole/liter $H_2SO_4$, 1:3-1:6 mole ratio $CF_3SO_3H:H_2O$ and 40% (w/w) aqueous PWA (i.e. $H_3PW_{12}O_{40}$) solution. FIG. 4 shows polarization curves for two acidic, aqueous solutions, each containing 1. 3M $H_2SO_4$+1M methanol and 2. 1:6 (V/V) $CF_3SO_3H:H_2O$+2M methanol.

In the same manner additional fuel cells were built and other fuels such as formaldehyde, formic acid, methylformat, ethylformat, oxalic acid, glycerol, ethylene glycole and dimethyloxalat were tested.

b) Second Fuel Cell Configuration

A second cell configuration was manufactured by painting the anode side flow field and both sides of the anode Toray TM paper with Pt:Ru ink. This modification was made in order to increase the catalyst content per square cm.

EXAMPLE 2

The crossover was measured by two test methods:
1. Using the regular configuration of the fuel cell but using nitrogen instead of oxygen at the anode and methanol in 3M $H_2SO_4$ at the cathode. The current (at 1V) measured is a product of the oxidation of the methanol that penetrated through the PCM from the cathode to the anode side.
2. The same as in Method 1 above but both electrodes were painted with Pt-Ru ink and the crossover current was calculated in the same way as in 1.

The crossover currents are summarized in Table 1. The crossover of 1 mole/liter methanol was measured at 50.65 and 75° C.

(I) TABLE 1

Crossover current densities at different temperatures and test methods (1 M methanol and 3 M sulfuric acid in $H_2O$), and a PCM with and 24% PVDF, 16% $SiO_2$ (w/w), hot pressed at 70° C. The PCM thickness was 300 micron and it was 60% porous.

| Temperature [° C.] | Test method 1 | | Test method 2 | |
|---|---|---|---|---|
| | Current density [mA/cm$^2$] | Cell Voltage [v] | Current density [mA/cm$^2$] | Cell Voltage [v] |
| 50 | 26 | 1 | 13 | 1 |
| 65 | | | 18.5 | 1 |
| 75 | | | 31.8 | 1 |

The measured crossover currents (at 1V) for the second cell configuration (with the Pt:Ru ink on the flow field) was 25.5 mA/cm$^2$ for 1 mole/liter methanol at 65° C. and 58.3 mA/cm$^2$ for 2 mole/liter methanol at 65° C.

The crossover current density for 0.1M oxalic acid was measured at 65° C. according to Method 1 and was found to be 0.3 mA/cm$^2$. The crossover current density for 0.1 M dimethyl oxalate was measured at 65° C. according to Method 1 and was found to be 6 mA/cm$^2$.

Figure 6:
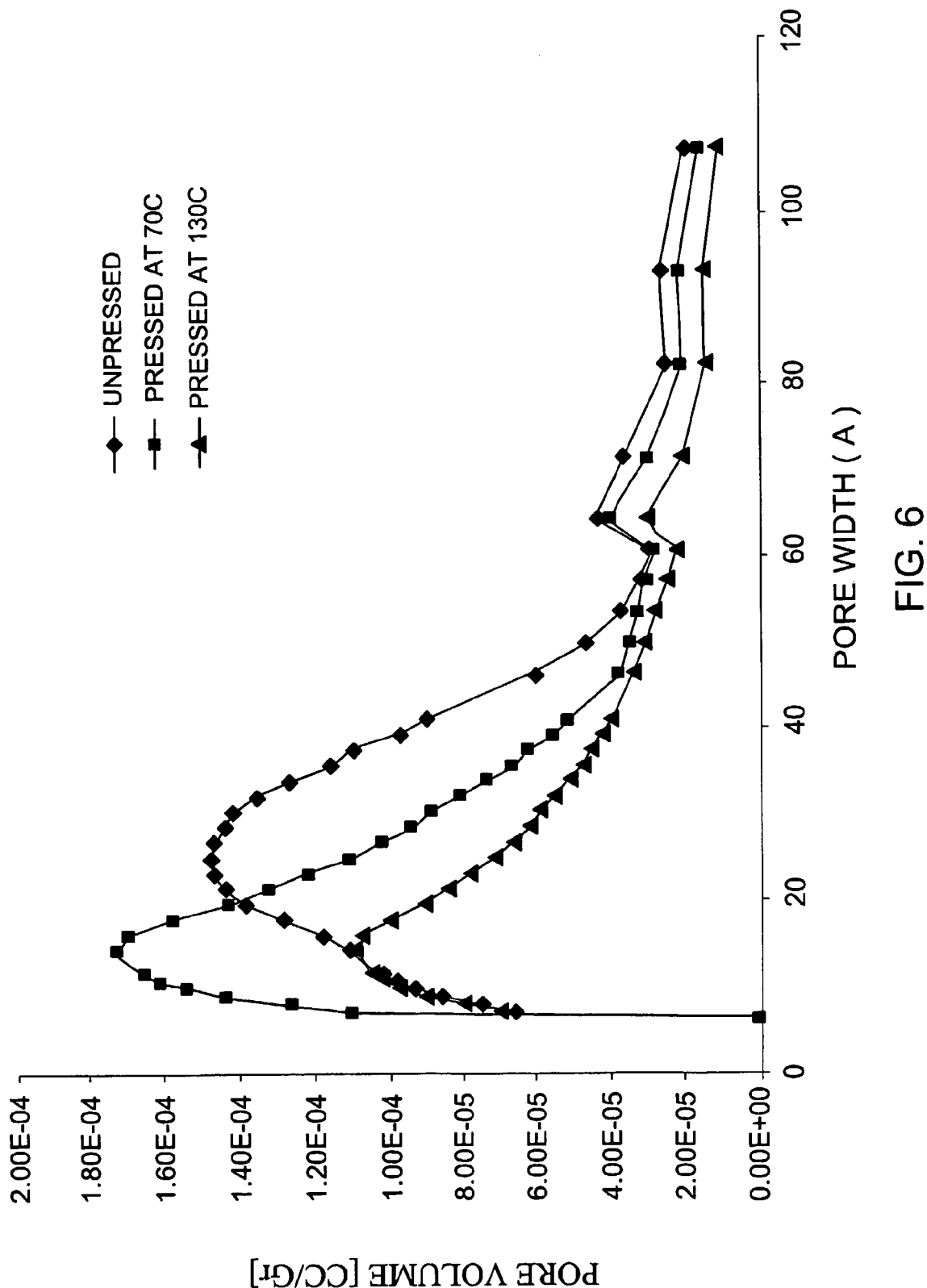
FIG. 6 shows a graph illustrating the relation between the pore size of PCMs and temperature of hot press

In order to reduce crossover of methanol through the PCM, the PCM was hot pressed at different temperatures between 70 and 130° C. The hot press was made in hydraulic press at about 40 Atmospheres for 30-250 seconds. As can be seen in FIG. 6 the pore size distribution, that was measured with Quantachrome NOVA 2200 Surface Area Analyzer, changed significantly upon the hot press. It was found that for an unpressed PCM, a significant volume of the material tested had pores dimension of less than 3 nm, while for a PCM that was subjected to hot pressing, a significant volume of the material tested had pores dimension of less than 1.5 nm. These nanozise pores have good retention capability for the acid and are small enough to reduce the methanol crossover.

Figure 5:
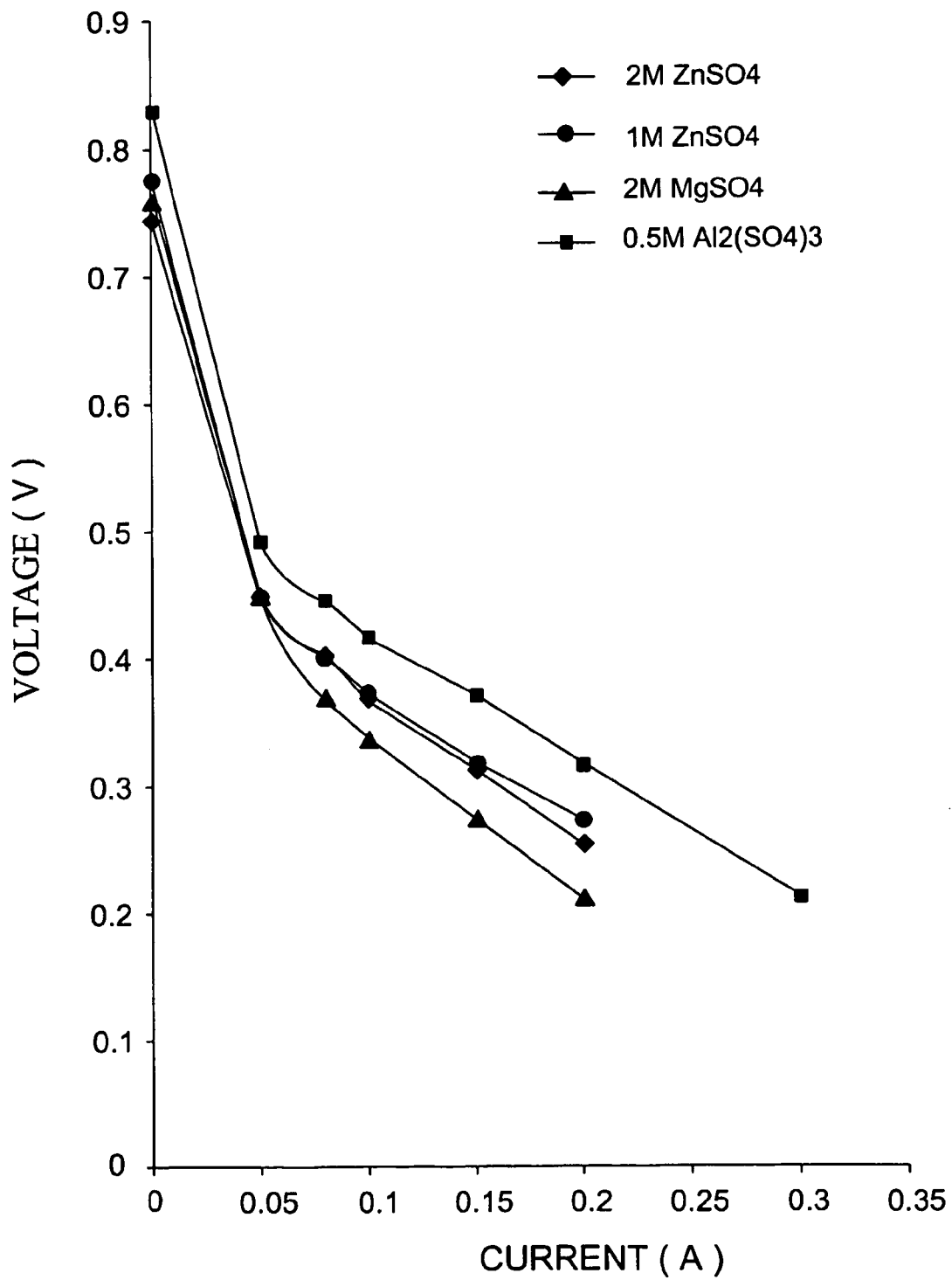
FIG. 5 shows a graph illustrating the effect of additives on polarization curves.

The effect of additives on the crossover is showed in Table 2 and in the polarization curves presented in FIG. 5. The PCM used consisted of (V/V) 24% PVDF, 16% $SiO_2$ hot pressed at 70° C., 60% 3 M sulfuric acid with the added metal sulfates. PCM thickness was 300 micron.

TABLE 2

Additive's influence on methanol crossover current, 1M methanol, 65° C.

| Additive | Salt Concentration [M] | Crossover current density [mA/cm$^2$] |
|---|---|---|
| $MgSO_4$ | 2 | 10 |
| $ZnSO_4$ | 1 | 20.8 |
| $ZnSO_4$ | 2 | 11.2 |
| $Al_2(SO_4)_3$ | 0.5 | 13.5 |
| Control | 0 | 25.5 |

EXAMPLE 3

In order to improve performance, another methanol fuel cell was manufactured with the use of pure metal catalysts, instead of carbon supported catalysts. A cathodic catalyst ink was prepared by the following process: A nano powder Pt (Pt black, purchased from "Johnson Matthey"), Teflon™ emulsion and Nafion™ 5% solution were combined in the following weight proportions: 60% Pt, 25% Teflon emulsion and 15% Nafion. First the Pt powder and the Teflon emulsion were mixed by sonication for 15 minutes. After two sonication periods, the ink obtained was placed on a magnetic stirrer for at least one night.

An anodic catalyst ink was prepared by the following process: A Pt:Ru nano powder (Pt:Ru black 50% purchased from "Johnson Matthey") and PVDF were mixed in the following weight proportions: 91% catalyst powder and 9% PVDF. Propylene carbonate was added in an amount equal to 30-70% of the catalyst volume, then cyclopentanone was added and the ink obtained was stirred for at least one night.

Preparation of the Electrodes: the Cathode Catalyst Ink was Applied on teflonated Toray™ carbon fiber paper, to form 4 mg Pt/cm$^2$. The ink (in the form of a paste) was spread in layers, allowing each layer to dry for about one hour, before the next layer was applied. This operation was repeated until the desired amount of catalyst was obtained. In the same way, the anode catalyst ink was applied on unteflonated Toray™ carbon fiber paper, until 5-10 mg catalyst/cm$^2$ was obtained. Both electrodes were washed with 3M sulfuric acid and then with water.

The cathode was hot pressed under a pressure of 10-70 Kg/cm$^2$, at a temperature of 85-130° C. to one side of a PCM with a thickness of 100-300 μm. The anode was placed on the other side of the PCM, parallel to the cathode and the complete cell was assembled.

Figure 7:
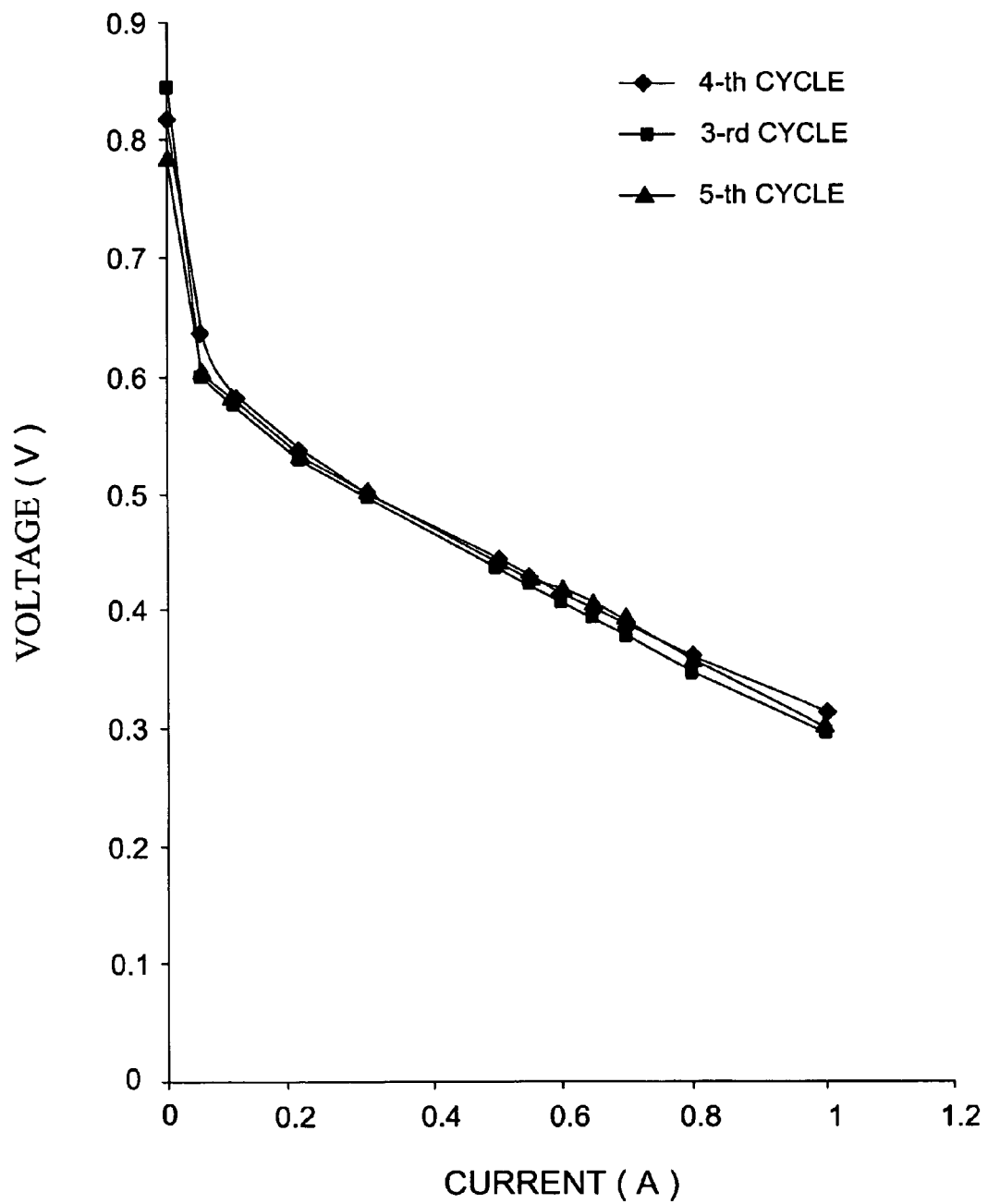
FIG. 7 shows a graph illustrating three consecutive polarization curves (3M $H_2SO_4$+1M MeOH at 65° C.).

FIG. 7 illustrates three consecutive polarization curves for this kind of fuel cell, under the following conditions: a solution of 1 M MeOH and 3M $H_2SO_4$ was circulated through the anode at a rate of 9 ml/min. Oxygen was circulated past the cathode at a pressure of 0.25 atm. over the atmospheric pressure. The cell temperature was 65° C. A 300 micron thick PCM consisting of (V/V) 16% nanosize powder of $SiO_2$, 24% PVDF and 60% pore volume, of 1.5 nm typical diameter. The cell demonstrated over 100 hours of stable operation at 0.4V. After 100 hours of operation the current change was less then 3%.

Figure 10:
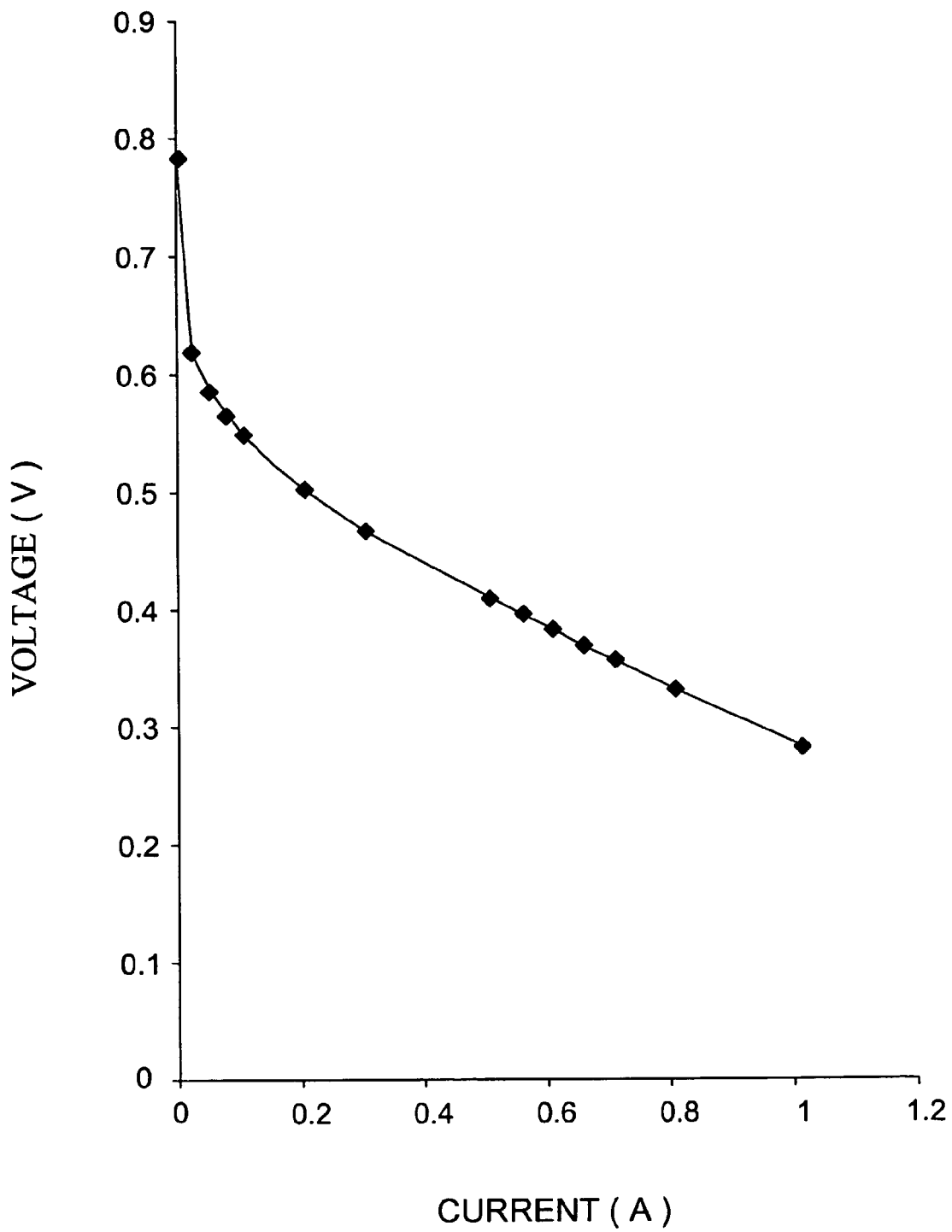
FIG. 10 shows a graph illustrating the polarization curve of a cell operating with a solution of 1M MeOH in 3M sulfuric acid.

Other cells were built according to the same procedure described above, but using another cathode ink. This cathode ink consisted of (weight %) 0-5% nanosize $SiO_2$, 20-40% Teflon and 40-80% nanosize Pt powder. FIG. 10 illustrates the polarization curves of these cells, operating with a solution of 1M MeOH in 3M sulfuric acid.

Measurements of fuel crossover were carried out at several temperatures by feeding nitrogen instead of oxygen into the cathode compartment (at ambient pressure) and feeding organic fuel-acid solution into the anode compartment. Cell voltage was reversed; hydrogen was evolved at the fuel electrode while fuel that crossed over to the cathode side was oxidized. The current that flows at 1V was found to be the limiting current for fuel oxidation.

EXAMPLE 4:

$H_2/O_2$ Fuel Cell

We engraved an Integrated Flow Field System into a graphite housing. The system is schematically described in FIG. 2. In this system the ratio of the electrolyte flow channels to gas flow channels is 1:2 and the maximum distance between adjacent electrolyte flow channels is 8 mm. We have fabricated a fuel cell system with an Integrated Flow Field System at the anode side. We then attached the fuel cell to gas providing systems that combined with an electrolyte circulating system. This system is built in such a way that the hydrogen and the electrolyte pressures at the Integrated Flow Field System are equal. The gas/electrolyte providing system is shown schematically in FIG. 8.

Figure 8:
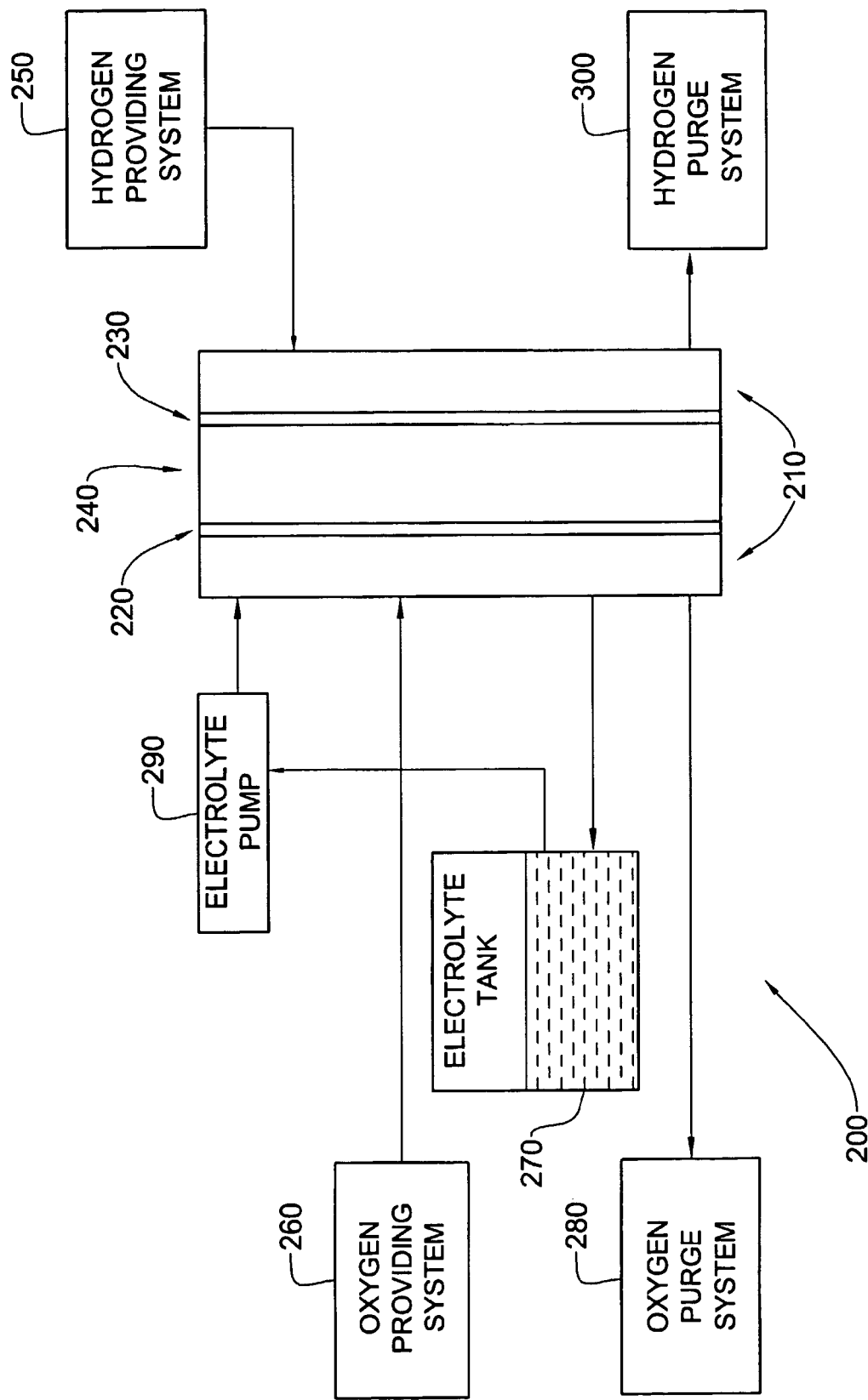
FIG. 8 shows a schematic representation of a $H_2/O_2$ fuel cell with integrated gas-acid flow field.

FIG. 8 illustrates a $H_2/O_2$ fuel cell 200 having a housing 210, an anode 220, a cathode 230 and a solid PCM 240. A hydrogen gas providing system 250 provides hydrogen to the fuel cell. An oxygen providing system 260 supplies oxygen either directly (as shown in FIG. 8) or via the electrolyte tank 270 in order to achieve an equalization in pressures. The cell further comprises an oxygen purge system 280, an electrolyte pump 290 and a hydrogen purge system 300. The pump we used was a peristaltic pump and the electrolyte was 1.5 M sulfuric acid.

Figure 9:
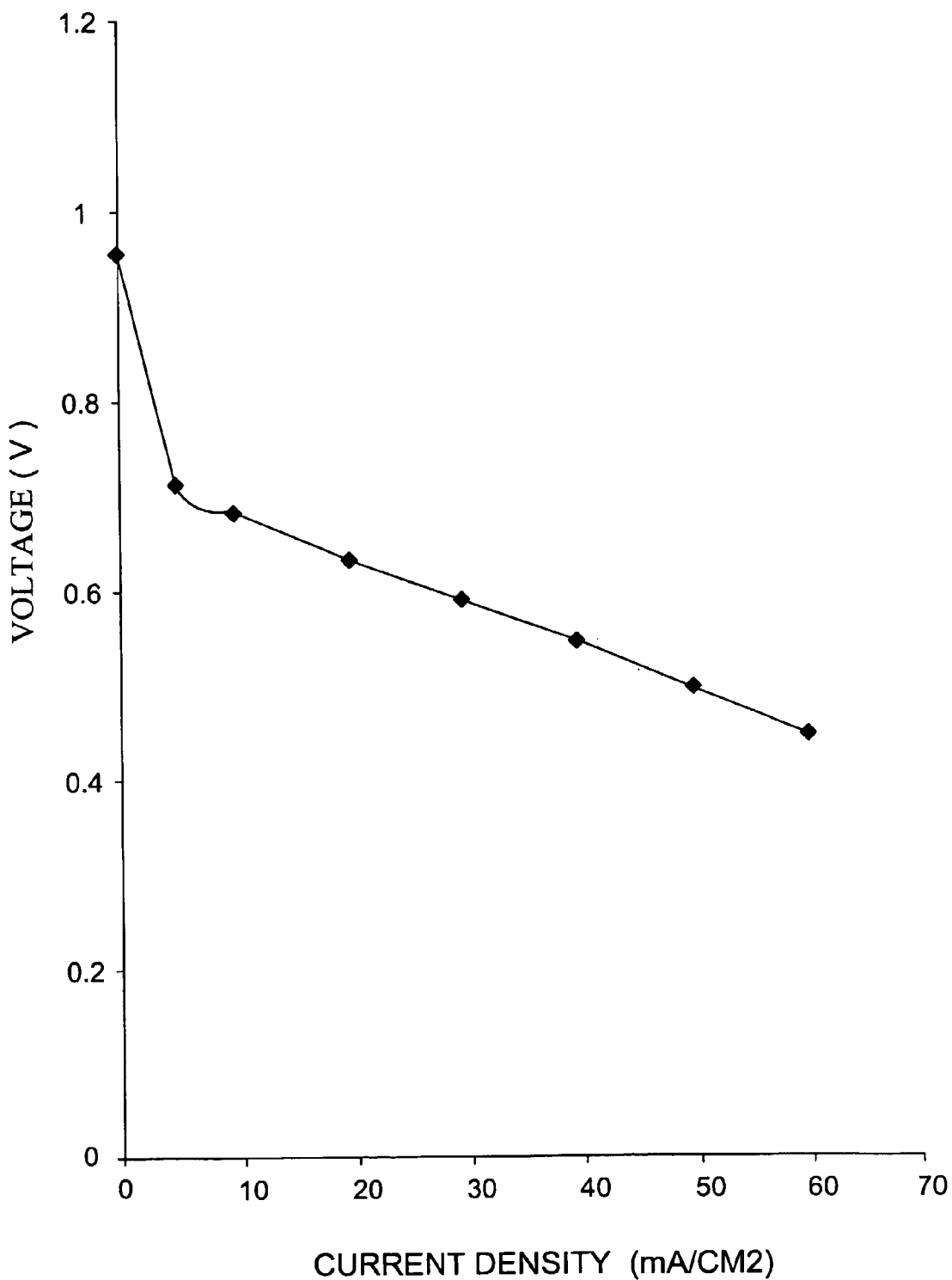
FIG. 9 shows a graph illustrating a polarization curve for a $H_2/O_2$ fuel cell (25° C., 1 psi $H_2$ and $O_2$ pressure).

FIG. 9 shows a polarization curve for this fuel cell, at 1 PSI (over atmospheric pressure) hydrogen and oxygen pressure, at room temperature (about 25° C.). The electrolyte was circulated at 9 m/min.

EXAMPLE 5

The low fuel crossover enables the use of the fuel cell of the invention as a replacement for a primary battery. In this case, a fuel-acid solution is not circulated but is stored in the anode side (compartment) in a porous carbon matrix. The air inlet ports may be closed, for example, by adhesive tape when this fuel cell is not in use.

Figure 11:
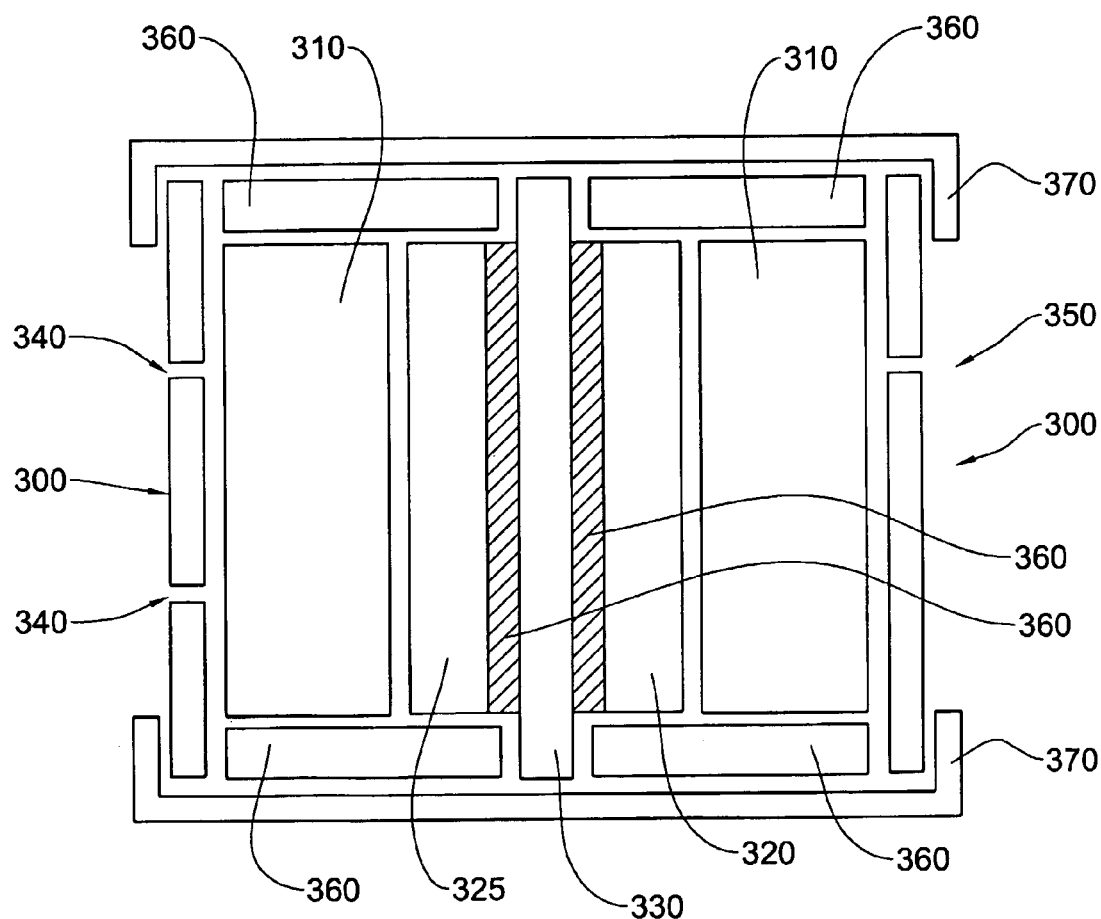
FIG. 11 shows a schematic representation of a fuel cell which operates as a primary battery.
Figure 12:
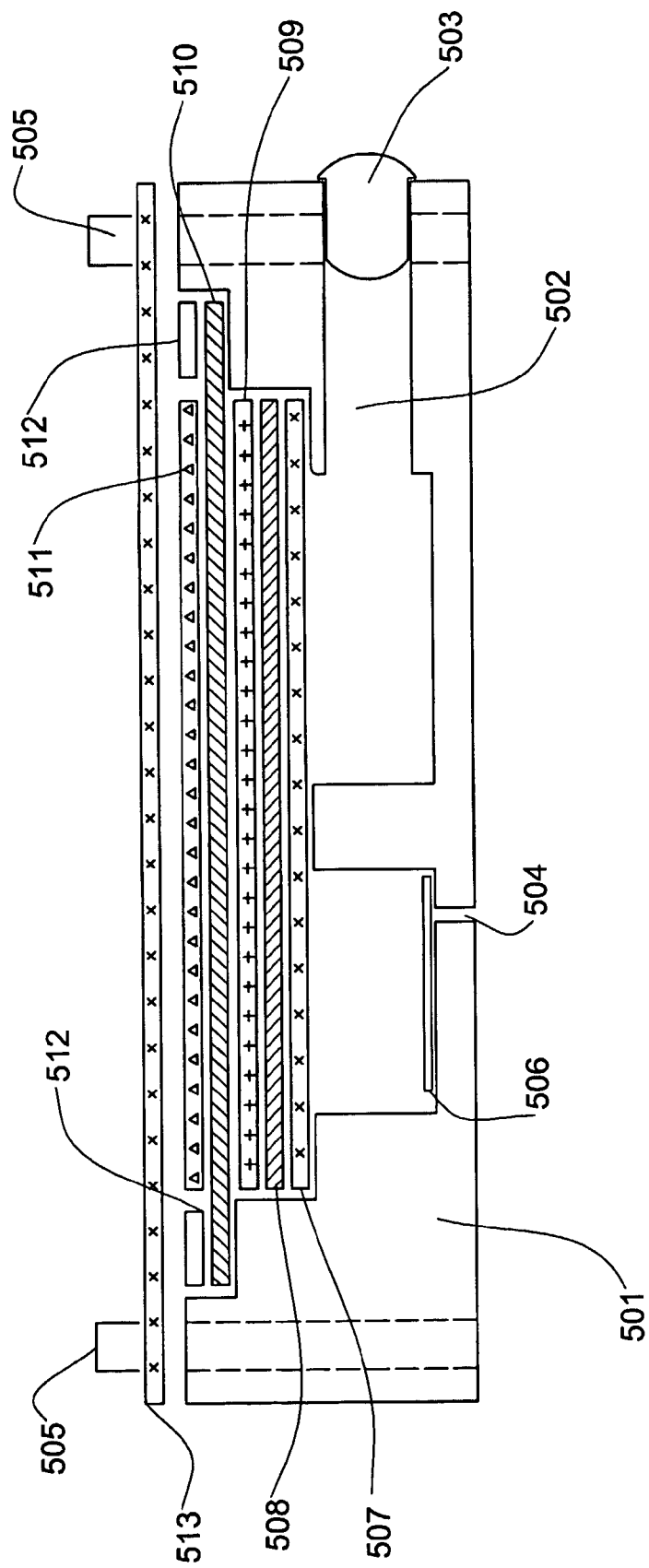
FIG. 12 provides a schematic representation of an improved solid feed organic fuel cell having a solid polymeric membrane configured in accordance with a preferred embodiment of the invention

FIG. 11 illustrates schematically this kind of fuel cell, having 0.6 mm thick Hastelloy C-276™ end plates 300, porous non-woven carbon felt (or matrix) RVC 1000™ (Carbone Lorraine) 310 which on one side serve as an air flow field and on the second side as storage cell for the fuel solution; Toray™ paper 320 and a Teflonated Toray™ paper 325 as backing layers, a PCM 330, air inlet ports 340, a fuel solution filling port 350, Teflon™ sealing rings 360, plastic envelopes made of shrinkable tube 370 for holding and sealing the whole assembly. On the cathode side of the PCM, 5 mg nanosize Pt catalyst (purchased from Johnson Matthey) was spread following the procedure described in Example 3, on the teflonated Toray paper 325 to form a catalyst layer 380 while on the anode side, 5 mg of nanosize Pt-Ru 1:1 (atomic ratio) catalyst (Johnson Matthey) was spread following the procedure described in Example 3, on Toray™ paper 320 to form a catalyst layer 390. Both Toray papers (after applying the catalysts) were hot pressed to the PCM at 100° C. and under a pressure of 40 kg./cm² for 200 sec. After cell assembly, a solution containing 1 M $H_2SO_4$ and 0.5M methanol was inserted through the fuel filling port 350 (closed by adhesive tape), and the cell was discharged. The open circuit voltage of the cell was 0.5V, and it delivered 1 mA/cm² for a few minutes.

In another experiment, a cell was assembled having a fuel tank of thickness 4 mm, located at the back side of the anode, and a PCM made of 10% silica, 30% PVDF and the balance voids, later filled with 3 M $H_2SO_4$. After cell assembly a solution containing 3M $H_2SO_4$ and 1M methanol was inserted through the fuel filling port 350 (closed by adhesive tape), and the cell was discharged. The open circuit voltage of the cell was 0.65V and it delivered 1 mA/cm² for a few hours. The crossover current density was 2 mA/cm². This low crossover value allows the use of fuel solutions with concentrations of 1% to 40%, compared with 3% to 6% that are feasible with current art cells.

EXAMPLE 6

An Orientation Independent DOFC

Figure 13:
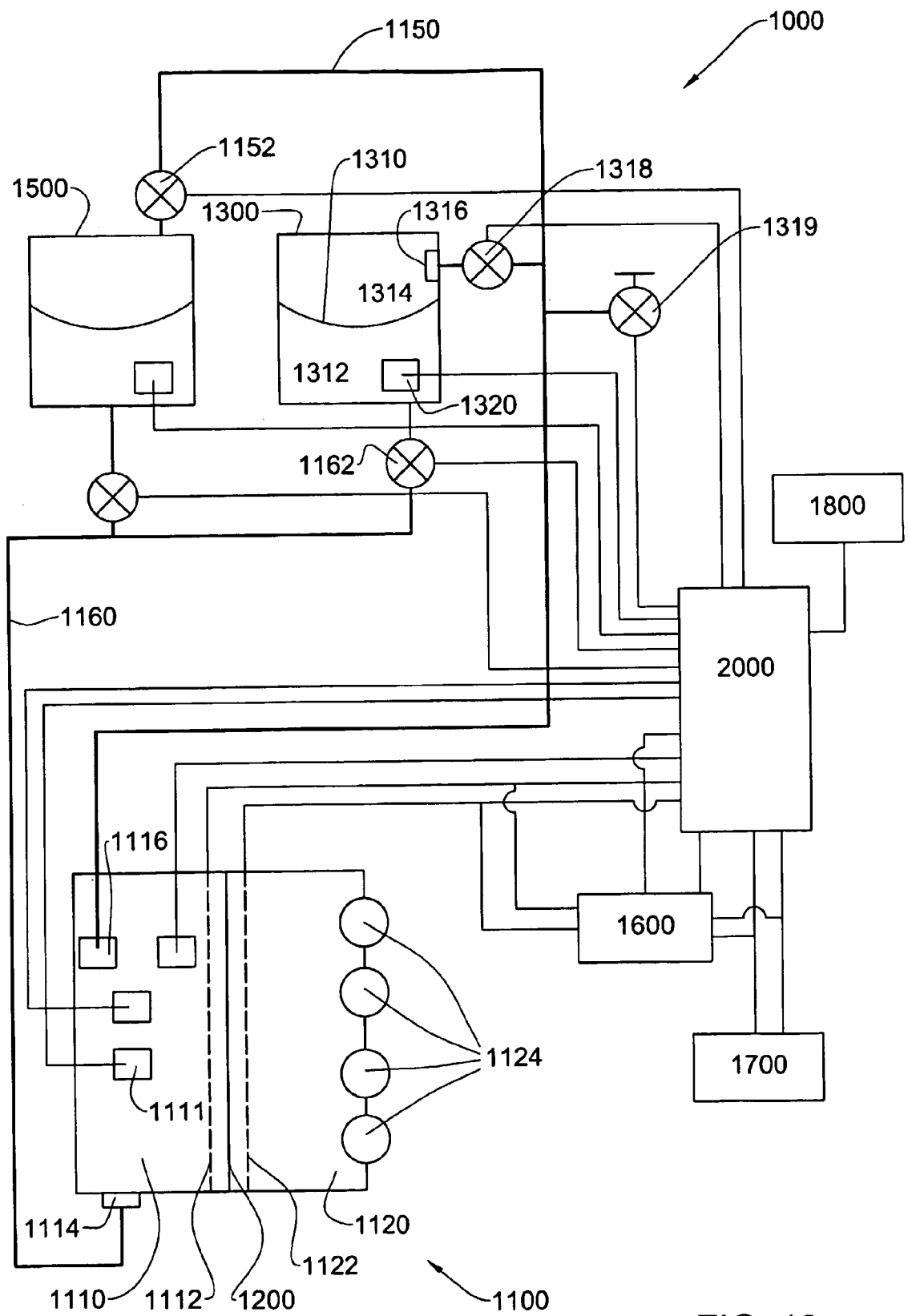
FIG. 13 is a schematic illustration of an orientation independent hybrid power source according to one embodiment of the present invention.

FIG. 13 illustrates an orientation independent direct oxidation fuel cell system that makes use of several aspects of the present invention. The system 1000 comprises a fuel cell 1100, having an anode chamber 1110 with an anode 1112, a fuel inlet 1114 and a gas outlet 1116, a cathode chamber 1120 with a cathode 1122 and air inlet holes 1124, an electrolyte membrane 1200, preferably according to WO99/44245 and/or this invention, disposed between the anode 1112 and the cathode 1122, and a fuel tank 1300, which preferably is disposable, connected to the anode chamber 1110 through a (liquid) pipe line 1160 and a valve 1162. The fuel tank 1300 is divided by a movable barrier 1310, into two parts: a first part 1312, which contains the fuel (either pure or in solution) and is connected to the anode chamber 1120, and a second part 1314, which optionally has a gas inlet 1316, by which gas may enter the second part 1314 to create there gas pressure of over one atmosphere. Alternatively, the gas pressure is provided by pressed gas stored permanently in the second part 1314. The barrier 1310 may be of any kind known in the art, such as a piston or a bladder. It is capable of directing fuel from the fuel tank 1300 to the anode chamber 1110 through the pipeline 1160 and valve 1162 irrespective of the orientation of the fuel cell system 1000. The gas outlet 1116 is closed with a gas permeable hydrophobic closure (not shown). The anode chamber 1110 and optionally the fuel tank 1300 are further equipped with fuel concentration sensors, 1111 and optionally 1320. The fuel concentration sensors 1111 and 1320 are connected to the controller 2000, which is capable of ordering streaming fuel from the fuel tank 1300 to the anode chamber 1110 through pipe line 1160 and valve 1162 in response to a fuel concentration that is under a predetermined value. In such occasions, the valve 1319, which is usually open to allow $CO_2$ escape into the atmosphere, should be closed.

A DC to DC converter 1600 is connected to the fuel cell 1100 and possibly to one or more other fuel cells (not shown) connected in series with the fuel cell 1100 and the DC to DC converter 1600. Thus, the system is actually a hybrid power source in accordance with the invention, capable of charging a battery, such as the battery 1700 or supplying power to a portable appliance 1800.

In the embodiment of FIG. 13, the second part of the fuel tank 1314 is full only with atmospheric air until operation, when it is filled through the gas inlet 1316 with $CO_2$, evolving from the oxidation of the fuel at the anode chamber 1110. The $CO_2$ is brought from the anode chamber 1110 by pipeline 1150 and valve 1318 to the second part of the fuel tank 1114.

The orientation independent fuel cell of FIG. 13 is preferably further equipped with a (preferably disposable) water tank 1500, which construction is similar to that of the fuel tank 1300. The water tank is needed in practice only in dry and hot environments, where water loss due to evaporation may require adding water to the system, or when pure fuel (and not a fuel solution) is used. Otherwise the fuel tank contains enough water for both the electrochemical reaction and the water loss due to evaporation.

The invention claimed is:

1. A direct oxidation fuel cell comprising an anode, a cathode and a fuel tank directly attached to the anode, allowing pump-free delivery of fuel from said tank to said anode, said anode or cathode having a surface area, the fuel tank having a volume (in ml), wherein a ratio of the fuel tank volume (in ml) and the anode or the cathode surface area (in $cm^2$) is between 1:3 to 1:230, said fuel cell having a crossover current density lower than 25 $mA/cm^2$.

2. The fuel cell according to claim 1, wherein said crossover current density is lower than 5 $mA/cm^2$.

3. The fuel cell according to claim 1, wherein said crossover current density is lower than 2 $mA/cm^2$.

4. The fuel cell according to claim 1, wherein said crossover current density is between 1.5 $mA/cm^2$ and 5 $mA/cm^2$.

5. The fuel cell according to claim 1, further comprising a solid electrolyte membrane disposed between said cathode and said anode.

6. The fuel cell according to claim 5, wherein said electrolyte membrane is a proton conducting membrane.

7. The fuel cell according to claim 6, wherein said proton conducting membrane comprises pores having a diameter smaller than 30 nm.

8. The fuel cell according to claim 6, wherein said proton conducting membrane comprises pores having a diameter smaller than 3 nm.

9. The fuel cell according to claim 6, wherein said proton conducting membrane comprises pores.

10. The fuel cell according to claim 9, wherein said pores comprise a polyheteroacid.

11. The fuel cell according to claim 10, wherein said polyheteroacid is selected from $H_3PW_{12}O_{40}$ and $H_4SiW_{12}O_{40}$.

12. The fuel cell according to claim 6, wherein said proton conducting membrane comprises:
(a) 5% to 60%, by volume, of an electrically nonconductive inorganic powder, comprising nanosize particles;
(b) 5% to 50%, by volume, of a polymeric binder that is chemically compatible with acid, oxygen and said fuel; and
(c) 10% to 90%, by volume, of an acid solution or an aqueous acid solution.

13. The fuel cell according to claim 12, wherein said inorganic powder in said proton conducting membrane is selected from the group consisting of $SiO_2$, $ZrO_2$, $B_2O_3$, $TiO_2$, $Al_2O_3$, hydroxides and oxy-hydroxides of Ti, Al, B and Zr, and any combinations thereof.

14. The fuel cell according to claim 12, wherein said polymeric binder in said proton conducting membrane is selected from the group consisting of polyvinylidene fluoride, poly(vinylidenefluoride)hexafluoropropylene, poly(tetrafluoroethylene), poly(methyl methacrylate), polysulfone amide, poly(acrylamide), poly(vinylchloride), acrylonitrile, poly(vinylfluoride), polychloro(trifluoroethylene) and any combinations thereof.

15. The fuel cell according to claim 12, wherein said acid in said proton conducting membrane is selected from the group consisting of a polyfluoroolefin sulfonic acid; a perfluoroolefin sulfonic acid; a polyfluoroaryl sulfonic acid; a perfluoroaryl sulfonic acid; where up to 50% of the hydrogen or fluorine atoms were replaced by chlorine atoms; $CF_3(CF_2)_n SO_3H$, $HO_3S(CF_2CH_2)_n SO_3H$, $CF_3(CF_2CH_2)_n SO_3H$, $HO_3S(CF_2)_n SO_3H$, where n is an integer having a value of 1 to 9; perfluorinated carbon backbone acids having sulfonic acid side chains, of the formula $-O(CF_2CF_2)_n SO_3H$ wherein n is 1 or 2; HCl; HBr; sulfuric acid; phosphoric acid; and mixtures thereof.

16. The fuel cell according to claim 1, wherein said fuel, is selected from the group consisting of methanol, ethylene glycol, ethanol, glycerol and its formate and oxalate esters, oxalic acid, formaldehyde, formic acid, glyoxylic acid and its methyl esters, glyoxylic aldehyde, methylformate, dimethoxymethane, trimethoxymethane, and trioxane.

17. The fuel cell according to claim 16, wherein said fuel is dissolved in an aqueous solution comprising an acid so as to obtain a fuel concentration of between 1% and 40% (w/w).

18. The fuel cell according to claim 17, wherein said aqueous solution further comprises salts selected from the group consisting of $ZnSO_4$, $Al_2(SO_4)_3$, $MgSO_4$, $CoSO_4$, $MnSO_4$, $Na_2SO_4$, $K_2SO_4$, and polyhetroacids selected from the group consisting of $H_3PW_{12}O_{40}\cdot 40H_2O$ and $H_4SiW_{12}O_4\cdot 29H_2O$, provided that said salts or polyhetroacids do not induce precipitation of solids during operation of said fuel cell.

19. The fuel cell according to claim 9, wherein said pores comprise nanoparticles of hydrated silica or silicic acid.

20. The fuel cell according to claim 16, wherein the fuel is in the form of an aqueous solution.

21. The fuel cell according to claim 9, wherein the fuel is an aqueous solution of methanol.

* * * * *